No. 763,308. PATENTED JUNE 21, 1904.
M. MITCHELL.
ROTARY SEED DISK.
APPLICATION FILED AUG. 23, 1902.
NO MODEL. 2 SHEETS—SHEET 1.
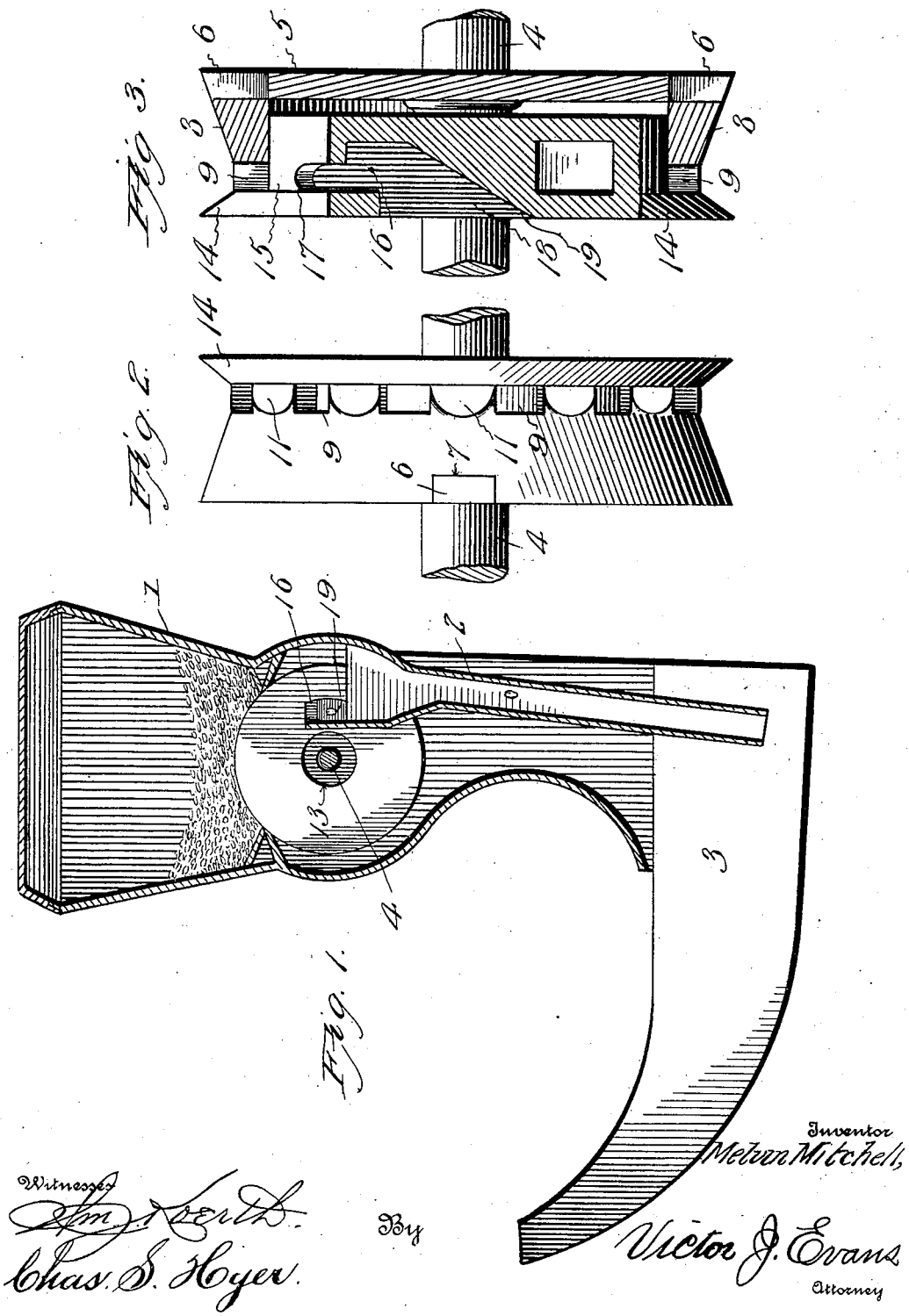

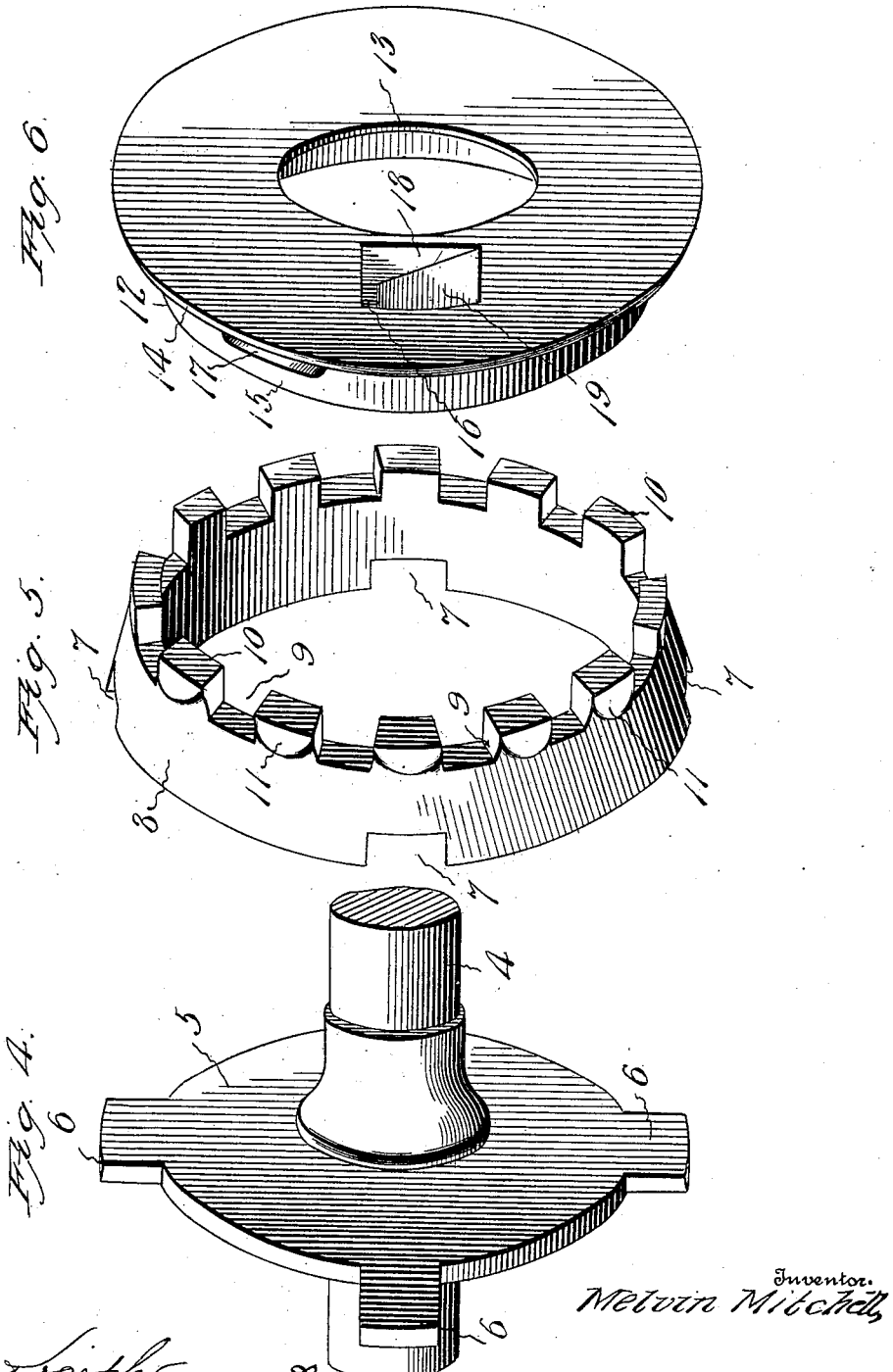

No. 763,308. Patented June 21, 1904.

UNITED STATES PATENT OFFICE.

MELVIN MITCHELL, OF MADISON, WISCONSIN.

ROTARY SEED-DISK.

SPECIFICATION forming part of Letters Patent No. 763,308, dated June 21, 1904.

Application filed August 23, 1902. Serial No. 120,842. (No model.)

*To all whom it may concern:*

Be it known that I, MELVIN MITCHELL, a citizen of the United States, residing at Madison, in the county of Dane and State of Wisconsin, have invented new and useful Improvements in Rotary Seed-Disks, of which the following is a specification.

This invention relates to a rotary seed-delivering means for use and disposition in the bottom of the hopper of a corn or other planter; and the object of the same is to provide a thoroughly practical rotary seed-plate adapted to be actuated directly by and rotate in the same direction as the drive-shaft of the machine and disposed in a vertical position in contradistinction to the usual horizontally-disposed seed-plates and to supply the plate with a sufficient number of cups to receive with certainty a single kernel in each cup and freely discharge the same through the medium of a single outlet-opening to obtain perfect regularity in the number of seeds dropped in each hill or planted in contiguous relation.

While grains of corn differ in length and width, they are more nearly uniform in thickness, and in view of this condition of proportion the seed-cups in the improved plate are sufficient in size to admit a single kernel edgewise into each, the plate being capable of operation by suitable well-known devices to cause the kernels or seed to be dropped regularly in hills or in rows.

The most important feature of the present invention is the provision of a stationary seed-bottom for the seed chambers or hoppers with which a rotary pocketed annulus coöperates and having the pockets or chambers therein wider at the bottom than at the top to retain the seed in the chambers or pockets until the proper time to deposit them.

The present invention also overcomes the difficulty of throwing corn from seed-chambers by quick rotation of the seed-plate and incorrect dropping of the seed, as was often the case with so-called "rotary" pick-up planters heretofore devised and which would by a quick rotation often throw the corn from the seed-chambers before reaching the seed-valve. The improved rotary seed-plate travels around a stationary bottom, with seed chambers or pockets larger at the bottom than at the top, as before set forth, and there is no tendency to throw the seed from the device, owing to a quick rotation, as the rotary part of the improved device slides the seed on the smooth surface of a stationary coöperating part without lifting the seed from the bottom and continues to slide the seed until it reaches the outlet-opening in the bottom of the stationary member of the device.

The invention also contemplates the details of construction and arrangement of the several parts, which will be more fully hereinafter described and claimed.

In the drawings, Figure 1 is a longitudinal vertical section through a part of a corn or analogous hopper and dropping-spout and a a furrow-opener, together with a rotary seed-plate embodying the features of the invention. Fig. 2 is an edge elevation of the improved device. Fig. 3 is a section taken through the device, as shown by Fig. 2. Fig. 4 is a detail perspective view of a portion of a drive-shaft, showing a clutch member thereon which forms a part of the improved plate. Fig. 5 is a detail perspective view of the rotary annulus, actuated by the clutch member, shown by Fig. 4. Fig. 6 is a detail perspective view of the stationary member of the plate.

Similar numerals of reference are employed to indicate corresponding parts in the several views.

The numeral 1 designates a hopper or supply-chamber; 2, a dropping-spout or conveyer; 3, a furrow-opener. All of these elements may be of the usual or any preferred form of construction, and the shaft 4 can be operated by suitable well-known devices to impart thereto an intermittent rotation at regular intervals or a continuous rotation to effect hill or continuous-row dropping. The improved rotary seed-plate is secured on the drive-shaft to rotate in the same direction as the latter. The improved seed-plate comprises three parts or members (shown by Figs. 4, 5, and 6) and consists of a clutch member 5, secured on the drive-shaft 4 and having diametrically-disposed clutch projections 6 to engage corresponding slots 7 in one side edge of a rotating annulus 8, which regularly converges from the edge having the slots 7 therein toward the opposite edge. The edge of the annulus 8 opposite that having the slots 7 formed therein is provided with a plurality of seed chambers or pockets 9 of equal dimensions and separated by projecting fingers 10, having an equal length and cut back at an upward bevel, as at 11, on their upper surfaces to cause the seed to have an unobstructed entrance into the chambers or pockets. The clutch member 5 and annulus 8 coöperate in relation to a stationary delivery member or bottom 12, having an enlarged central opening 13, through which the shaft 4 freely extends. The delivery member or bottom 12 has a surrounding flange 14 at one side projecting from a rim 15, the said rim being of such diameter as to permit the chambered or pocketed side of the annulus 8 to movably fit thereover. A channel 16 is formed in a portion of the rim and has an elongated inlet-slot 17 communicating therewith and located in the periphery of the rim and an outlet-opening 18 formed in the side of the delivery member having the flange 14. The opening 18 has a lower downwardly and outwardly inclined wall 19, and when all the parts are assembled the upper end of the dropping-tube or feeding-spout is located close to the lower end or terminal of the said opening 18. When the annulus and its clutch member are assembled in relation to the rim of the delivery member, the periphery of the annulus inclines inwardly toward the flange 14 of the delivering member, as clearly shown by Figs. 2 and 3, and when the parts are assembled in operative relation to the bottom of a hopper or seed-receptacle of a planter the seed will be caused to move toward the flange 14 in view of the said inclination of the annulus. In assembling the improved plate in connection with the bottom of the hopper or seed-containing receptacle 1 a slot of sufficient size is made in the bottom of said hopper or receptacle to permit the disk as an entirety to partially project upwardly therethrough, as clearly indicated by Fig. 1. The delivering member 12 is then secured by any suitable means to prevent movement thereof and so arranged that the slot 17 will be uppermost, but to one side of the upper extremity of the vertical diameter of the entire seeding means. As the shaft 4 revolves the annulus 8 is correspondingly rotated and brings successive chambers or pockets 9 over the slot 17 of the delivering member and regularly carries the seed to the said slot and from the latter passes into the channel 16 and out through the opening 18 into the delivery-spout or dropping-tube 2, as clearly shown by Fig. 1. By this means the seed will be regularly fed from the hopper or receptacle 1 and a similar number deposited in each hill or regularly dropped in a continuous row in accordance with the nature of operation of the shaft 4. It is also proposed to supply annuli having pockets or chambers of various dimensions to accommodate different sizes of seeds or grain, and in providing such additional parts they will be made to fit over the rim of the delivering member and also be adapted to be engaged by the clutch member, so that a single delivering member and clutch member may be used with a number of annuli having pockets of various sizes. It is also obvious that changes in the proportions, dimensions, and minor details may be resorted to without departing from the principle of the invention.

Having thus fully described the invention, what is claimed as new is—

1. A vertically-disposed seed device, comprising a stationary delivering member having an opening therethrough, and an annulus rotatable on the said delivering member and provided with a plurality of pockets opening out through one side edge.

2. A vertically-disposed seed device, comprising a stationary delivering member having a flange surrounding one edge and an opening therethrough, and an annulus rotatable on the delivering member and formed with a series of pockets in one edge, the latter edge being disposed close to the flange of the delivering member and the peripheral surface of said annulus inclining inwardly toward said flange.

3. A rotary seed device, comprising a stationary member having a rim and a surrounding flange, a channel being formed in the rim with an inlet at the peripheral portion of the latter, and an outlet at the side on which the flange is located, and an annulus freely rotatable on the rim of the delivering member and provided with a series of pockets arranged adjacent to the flange of the delivering member and adapted to successively coincide with the inlet of the opening through the rim, the peripheral surface of the annulus inclining inwardly toward the pockets and flange.

4. The combination with a seed-hopper, of a vertically-disposed rotary seed device in the bottom thereof and comprising a stationary delivering member with an opening therethrough, and a rotary annulus on the delivering member provided with a plurality of seed-carrying pockets opening out through one side edge at the periphery thereof.

5. A rotary seed device comprising a stationary delivering member having an opening therethrough, a drive-shaft projecting through the delivering member, a clutch member secured to and rotatable with the said shaft, and an annulus detachably engaged by the clutch member and rotatably mounted over a portion of the delivering member, the said annulus having a plurality of seed-carrying pockets in one edge.

In testimony whereof I affix my signature in presence of two witnesses.

MELVIN MITCHELL.

Witnesses:
 JNO. MILLER WINTERBOTHAM,
 H. W. WINTER.